(12) United States Patent
Ueta et al.

(10) Patent No.: US 11,789,730 B2
(45) Date of Patent: Oct. 17, 2023

(54) ELECTRONIC CONTROL DEVICE AND CONTROL METHOD

(71) Applicant: Hitachi Astemo, Ltd., Hitachinaka (JP)

(72) Inventors: Taisuke Ueta, Tokyo (JP); Tatsuya Horiguchi, Tokyo (JP); Kenichi Shimbo, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 141 days.

(21) Appl. No.: 17/428,107

(22) PCT Filed: Jan. 29, 2020

(86) PCT No.: PCT/JP2020/003150
§ 371 (c)(1),
(2) Date: Aug. 3, 2021

(87) PCT Pub. No.: WO2020/162280
PCT Pub. Date: Aug. 13, 2020

(65) Prior Publication Data
US 2022/0058020 A1    Feb. 24, 2022

(30) Foreign Application Priority Data
Feb. 7, 2019  (JP) ................................ 2019-020509

(51) Int. Cl.
*G06F 9/30* (2018.01)
*G06F 9/345* (2018.01)
(Continued)

(52) U.S. Cl.
CPC ............ *G06F 9/3001* (2013.01); *G06F 9/345* (2013.01); *G06F 9/3877* (2013.01); *G06F 9/44505* (2013.01)

(58) Field of Classification Search
CPC ...... G06F 9/3001; G06F 9/345; G06F 9/3877; G06F 9/44505; G06F 11/1641; G06F 11/07; G06F 11/16; B60W 50/00
See application file for complete search history.

(56) References Cited

U.S. PATENT DOCUMENTS 5,530,815 A  *  6/1996  Nabekura ............... G06F 11/08
712/E9.062
2006/0236168 A1* 10/2006  Wolfe .................. G06F 15/7867
714/E11.061
(Continued)

FOREIGN PATENT DOCUMENTS

JP    2008-518306 A    5/2008
JP    2008-538151 A   10/2008
(Continued)

OTHER PUBLICATIONS

International Search Report with English translation and Written Opinion issued in corresponding application No. PCT/JP2020/003150 dated Apr. 21, 2020.

*Primary Examiner* — Farley Abad
(74) *Attorney, Agent, or Firm* — Foley & Lardner LLP

(57) ABSTRACT

An electronic control device includes a processing control unit and an information acquisition unit. The information acquisition unit collects and transfers external environment information to the processing control unit, the processing control unit includes a first processor, a second processor, and a storage unit, the processing control unit executes arithmetic processing by a non-redundant and redundant processing configuration that executes non-redundant and redundant processing using the first processor and the second processor, respectfully, and the processing control unit stores a result of arithmetic processing by the non-redundant processing configuration in the storage unit, individually performs arithmetic processing using the stored result in
(Continued)

both the first processor and the second processor by arithmetic processing by the redundant processing configuration, and performs determination for an arithmetic processing result by the non-redundant processing configuration based on an arithmetic result by the first processor and an arithmetic result by the second processor.

8 Claims, 12 Drawing Sheets

(51) Int. Cl.
*G06F 9/38* (2018.01)
*G06F 9/445* (2018.01)

(56) References Cited

U.S. PATENT DOCUMENTS

| | | | |
|---|---|---|---|
| 2008/0091927 A1* | 4/2008 | Mueller | G06F 11/1695 |
| | | | 712/E9.035 |
| 2008/0270746 A1 | 10/2008 | Mueller et al. | |
| 2009/0040934 A1* | 2/2009 | Matsubara | G06F 11/0739 |
| | | | 370/242 |
| 2013/0151814 A1 | 6/2013 | Ueda | |
| 2019/0258251 A1* | 8/2019 | Ditty | G06F 15/7807 |

FOREIGN PATENT DOCUMENTS

| | | |
|---|---|---|
| JP | 2014-102692 A | 6/2014 |
| WO | WO-2013/088519 A1 | 6/2013 |

\* cited by examiner

*FIG. 6*

| NAME | PROCESSING CONFIGURATION | PROCESSOR OPERATION | LOGIC CIRCUIT |
|---|---|---|---|
| SURROUNDING RECOGNITION PROCESSING | PROCESSING CONFIGURATION A | SURROUNDING RECOGNITION PROCESSING OPERATION | SURROUNDING RECOGNITION PROCESSING CIRCUIT |
| DETERMINATION PROCESSING | PROCESSING CONFIGURATION B | FIRST DETERMINATION PROCESSING OPERATION, SECOND DETERMINATION PROCESSING OPERATION | FIRST DETERMINATION PROCESSING CIRCUIT, SECOND DETERMINATION PROCESSING CIRCUIT |
| BEHAVIOR PREDICTION PROCESSING | PROCESSING CONFIGURATION A | BEHAVIOR PREDICTION PROCESSING OPERATION | BEHAVIOR PREDICTION PROCESSING CIRCUIT |
| TRACK PLAN PROCESSING | PROCESSING CONFIGURATION A | TRACK PLAN PROCESSING OPERATION | TRACK PLAN PROCESSING CIRCUIT |

601   602   603   604

ELECTRONIC CONTROL DEVICE AND CONTROL METHOD

TECHNICAL FIELD

The present invention relates to an electronic control device and a control method.

BACKGROUND ART

Technology development aiming at automatic driving of a vehicle is in progress. In automatic driving, it is necessary to recognize the surroundings and control the vehicle for the driver, and enormous information processing is required. In order to cope with an increasing amount of information processing, in addition to a study of utilizing multi-cores of a central processing unit (CPU), a study of using a programmable logic device (PLD) such as a field programmable gate array (FPGA) in which a logic circuit can be reconfigured as a hardware accelerator is in progress. In a case where these studies are applied to control of automatic driving, appropriate processing in consideration of reliability is required. PTL 1 discloses a multi-core processor including a monitored processor core whose processing result is monitored, a monitoring processor core group including two or more monitoring processor cores capable of performing processing for monitoring the monitored processor core, an evaluating means for evaluating a processing load of the monitoring processor core group, and controlling means for causing the monitoring processor core group to perform processing for monitoring the monitored processor core in a distributed manner in a case where the evaluating means evaluates that a processing load of the monitoring processor core group is low, and causing a monitoring processor core that performs processing with relatively low priority among the monitoring processor core group to perform processing for monitoring the monitored processor core in a case where the evaluating means evaluates that a processing load of the monitoring processor core group is high.

CITATION LIST

Patent Literature

PTL 1: WO 2013/088519 A

SUMMARY OF INVENTION

Technical Problem

In the invention described in PTL 1, there is room for reducing the cost for realizing the redundant processing.

Solution to Problem

According to a first aspect of the present invention, there is provided an electronic control device that includes a processing control unit and an information acquisition unit. The information acquisition unit collects external environment information and transfers the external environment information to the processing control unit, the processing control unit includes a first processor, a second processor, and a storage unit, the processing control unit executes arithmetic processing by a non-redundant processing configuration that executes non-redundant processing using the first processor and the second processor, and arithmetic processing by a redundant processing configuration that executes redundant processing using the first processor and the second processor, and the processing control unit stores a result of arithmetic processing by the non-redundant processing configuration in the storage unit, individually performs arithmetic processing using the stored result in both the first processor and the second processor by arithmetic processing by the redundant processing configuration, and performs determination for an arithmetic processing result by the non-redundant processing configuration based on an arithmetic result by the first processor and an arithmetic result by the second processor.

According to a second aspect of the present invention, there is provided a control method executed by an electronic control device including a processing control unit and an information acquisition unit, the processing control unit including a first processor, a second processor, and a storage unit. The control method includes causing the information acquisition unit to collect external environment information and transfer the external environment information to the processing control unit, causing the processing control unit to execute arithmetic processing by a first processing configuration that executes non-redundant processing using the first processor and the second processor, and arithmetic processing by a second processing configuration that executes processing individually by causing the first processor and the second processor to be redundant, and causing the processing control unit to store a result of arithmetic processing by the first processing configuration in the storage unit, individually perform arithmetic processing using the stored result in both the first processor and the second processor by arithmetic processing by the second processing configuration, and perform determination for an arithmetic processing result by the first processing configuration based on an arithmetic result by the first processor and an arithmetic result by the second processor.

Advantageous Effects of Invention

According to the present invention, determination by a redundant configuration can be realized at low cost. An object, a configuration, and an advantageous effect other than those described above will be clarified in description of embodiments described below.

BRIEF DESCRIPTION OF DRAWINGS

FIG. 6 is a diagram illustrating an example of a management DB 3.

DESCRIPTION OF EMBODIMENTS

First Embodiment

Hereinafter, a first embodiment of an autonomous traveling control device which is an electronic control device will be described with reference to FIGS. 1 to 8.

<System Configuration>

Figure 1:
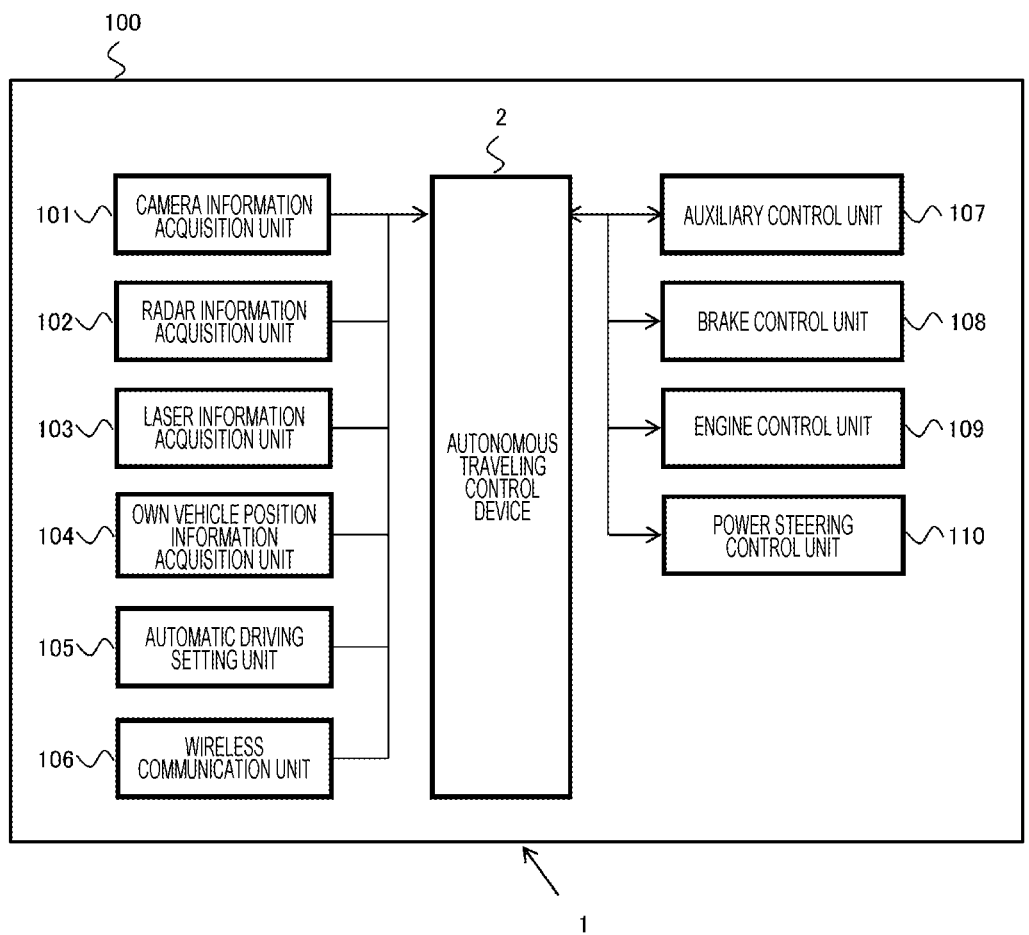
FIG. 1 is a system configuration diagram of an in-vehicle system 1.

FIG. 1 is a system configuration diagram of an in-vehicle system 1 including an autonomous traveling control device 2. The in-vehicle system 1 is mounted on a vehicle 100. The vehicle 100 includes a camera, a radar, and a laser (not illustrated) that acquire an external environment situation of the vehicle 100. Note that, hereinafter, the camera, the radar, and the laser are collectively referred to as a "sensor". Furthermore, although not illustrated, the vehicle 100 includes a receiver of a satellite navigation system, for example, a receiver of a global positioning system (GPS).

The in-vehicle system 1 includes a camera information acquisition unit 101 that acquires an external environment situation of the vehicle 100 from a camera (not illustrated), a radar information acquisition unit 102 that acquires an external environment situation of the vehicle 100 from a radar (not illustrated), a laser information acquisition unit 103 that acquires an external environment situation of the vehicle 100 from a laser (not illustrated), and an own vehicle position information acquisition unit 104 that detects the position of the vehicle 100 using a receiver of a satellite navigation system. The in-vehicle system 1 further includes an automatic driving setting unit 105 for setting automatic driving of the vehicle 100 and a wireless communication unit 106 for updating information of the in-vehicle system 1 by Over-The-Air (OTA).

The in-vehicle system 1 further includes the autonomous traveling control device 2, an auxiliary control unit 107, a brake control unit 108, an engine control unit 109, and a power steering control unit 110. The autonomous traveling control device 2, the auxiliary control unit 107, the brake control unit 108, the engine control unit 109, and the power steering control unit 110 are, for example, electronic control units (ECUs).

The camera information acquisition unit 101, the radar information acquisition unit 102, the laser information acquisition unit 103, the own vehicle position information acquisition unit 104, the automatic driving setting unit 105, the wireless communication unit 106, the autonomous traveling control device 2, the auxiliary control unit 107, the brake control unit 108, the engine control unit 109, and the power steering control unit 110 are connected to be able to communicate with each other by an in-vehicle network such as a controller area network (CAN) or Ethernet (registered trademark).

The camera information acquisition unit 101, the radar information acquisition unit 102, the laser information acquisition unit 103, and the own vehicle position information acquisition unit 104 transmit information received from a sensor or the like to the autonomous traveling control device 2. Further, the camera information acquisition unit 101, the radar information acquisition unit 102, the laser information acquisition unit 103, and the own vehicle position information acquisition unit 104 may transmit information obtained by detecting abnormality of a sensor or the like to the autonomous traveling control device 2.

The automatic driving setting unit 105 transmits setting information such as a destination, a route, and a traveling speed during automatic driving to the autonomous traveling control device 2. However, part of the information transmitted by the automatic driving setting unit 105 may be received from the outside via the wireless communication unit 106.

The autonomous traveling control device 2 performs processing for automatic driving control, and outputs a control command to the brake control unit 108, the engine control unit 109, and the power steering control unit 110 on the basis of a processing result. The auxiliary control unit 107 performs the same control as that of the autonomous traveling control device 2 as an auxiliary. The brake control unit 108 controls a braking force of the vehicle 100. The engine control unit 109 controls a driving force of the vehicle 100. The power steering control unit 110 controls the steering of the vehicle 100.

When receiving an automatic driving setting request from the automatic driving setting unit 105, the autonomous traveling control device 2 calculates a track on which the vehicle 100 moves based on external environment information from the camera information acquisition unit 101, the radar information acquisition unit 102, the laser information acquisition unit 103, the own vehicle position information acquisition unit 104, and the like. Then, the autonomous traveling control device 2 outputs a control command for a braking force, a driving force, steering, and the like to the brake control unit 108, the engine control unit 109, and the power steering control unit 110 so as to move the vehicle 100 according to the calculated track. The brake control unit 108, the engine control unit 109, and the power steering control unit 110 receive a control command from the autonomous traveling control device 2, and output an operation signal to an actuator which is a control target (not illustrated).

<Hardware Configuration of Autonomous Driving Control Unit>

Figure 2:
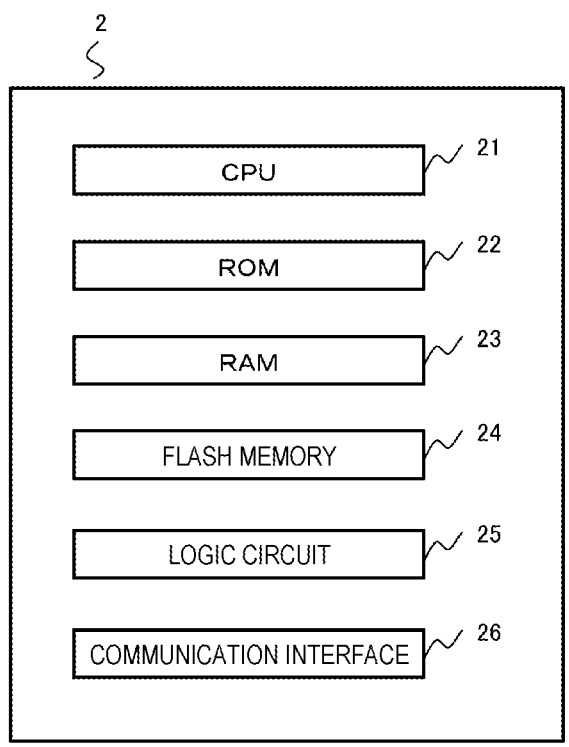
FIG. 2 is a hardware configuration diagram of an autonomous traveling control device 2.

FIG. 2 is a hardware configuration diagram of the autonomous traveling control device 2. The autonomous traveling control device 2 includes a CPU 21, a ROM 22, a RAM 23, a flash memory 24, a logic circuit 25, and a communication interface 26. The CPU 21 loads a program stored in the ROM 22 into the RAM 23 and executes the program to realize a function to be described later. The flash memory 24 is a nonvolatile storage area. The logic circuit 25 is a reconfigurable logic circuit using a PLD such as an FPGA. The logic circuit 25 is what is called a partially reconfigurable logic circuit which can be reconfigured only partially. The communication interface 26 is an interface that communicates using a predetermined protocol such as CAN.

Note that hardware of the CPU 21, the ROM 22, the RAM 23, the flash memory 24, and the logic circuit 25 constituting the autonomous traveling control device 2 may be configured on an ECU as one device or a plurality of devices, or may be configured on the ECU as one device including a plurality of pieces of hardware such as a system on chip (SoC). Further, the autonomous traveling control device 2 may be composed of one ECU or may be composed of a plurality of ECUs.

<Functional Configuration of Autonomous Traveling Control Device>

Figure 3:
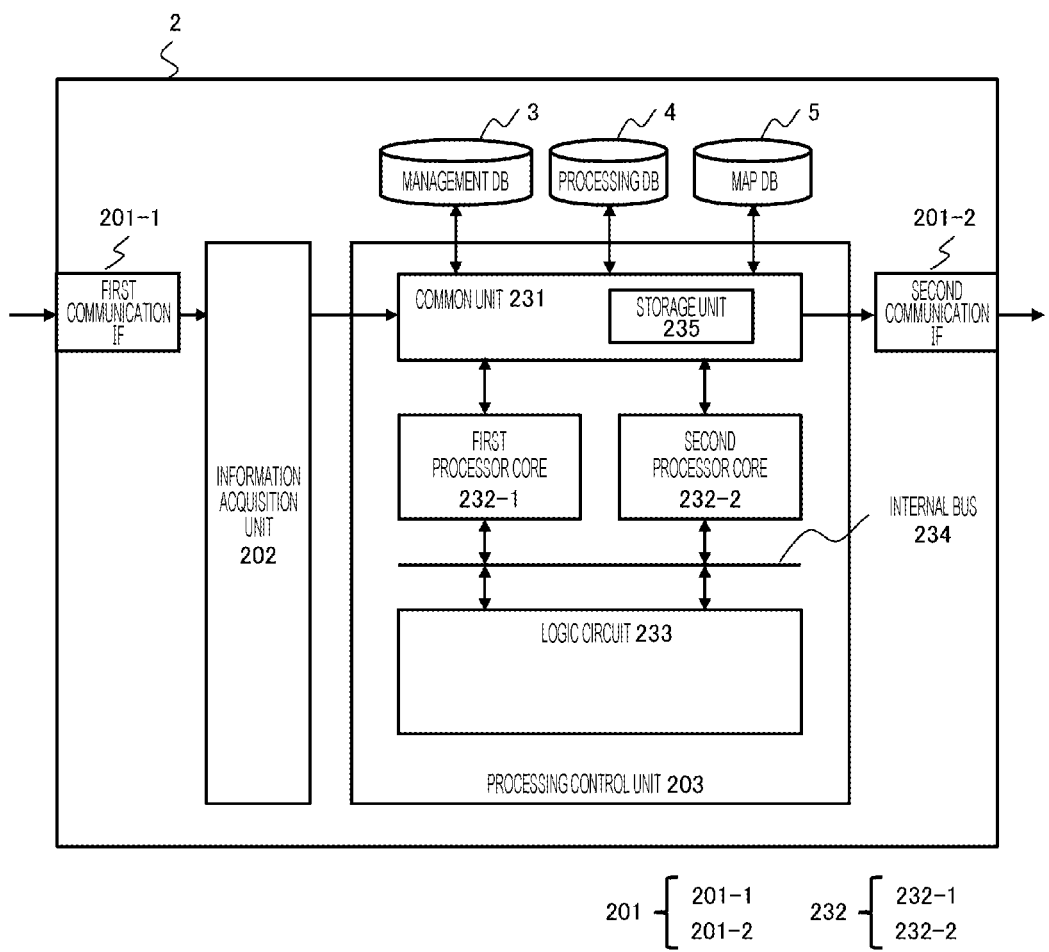
FIG. 3 is a functional configuration diagram of the autonomous traveling control device 2.

FIG. 3 is a functional configuration diagram of the autonomous traveling control device 2. The autonomous traveling control device 2 includes a first communication interface 201-1, a second communication interface 201-2, an information acquisition unit 202, a processing control unit 203, a management database (hereinafter, management DB) 3, a processing database (hereinafter, processing DB) 4, and a map database (hereinafter, map DB) 5. The processing control unit 203 includes a common unit 231 including a storage unit 235, a first processor core 232-1, a second processor core 232-2, a logic circuit 233, and an internal bus 234. Hereinafter, the first communication interface 201-1 and the second communication interface 201-2 are collectively referred to as the "communication interface 201". Further, the first processor core 232-1 and the second processor core 232-2 are collectively referred to as the "processor core 232".

The communication interface 201 is realized by the communication interface 26 in FIG. 2. The management DB 3, the processing DB 4, and the map DB 5 are information stored in the RAM 23 or the flash memory 24. The information acquisition unit 202 includes either one of the CPU 21 and the logic circuit 25, and may be configured to coexist with the processing control unit 203. The processing control unit 203 mainly includes the CPU 21 and the logic circuit 25. The common unit 231 and the processor core 232 include the CPU 21, and the logic circuit 233 includes the logic circuit 25. The common unit 231 may be configured as another processor core. The storage unit 235 may be configured in the first processor core 232-1 or the second processor core 232-2, or may be realized by the RAM 23 or the flash memory 24.

The autonomous traveling control device 2 is connected to the camera information acquisition unit 101, the radar information acquisition unit 102, the laser information acquisition unit 103, the own vehicle position information acquisition unit 104, the automatic driving setting unit 105, and the wireless communication unit 106 in FIG. 1 via the first communication interface 201-1. The autonomous traveling control device 2 is connected to the auxiliary control unit 107, the brake control unit 108, the engine control unit 109, and the power steering control unit 110 via the second communication interface 201-2. In FIG. 3, the autonomous traveling control device 2, which includes two logical communication interfaces, the first communication interface 201-1 and the second communication interface 201-2, may include only one logical communication interface having functions of both of them.

The information acquisition unit 202 acquires sensor information from the camera information acquisition unit 101, the radar information acquisition unit 102, the laser information acquisition unit 103, and the own vehicle position information acquisition unit 104, and automatic driving setting information from the automatic driving setting unit 105, which are input from the communication interface 201-1. The information acquisition unit 202 transmits sensor information and automatic driving setting information to the processing control unit 203 at a predetermined processing period to be described later.

When acquiring the information from the information acquisition unit 202, the processing control unit 203 executes predetermined processing, controls a processing execution result as a series of execution results, and outputs a control command for a braking force or a driving force from the communication interface 201-2 on the basis of the controlled execution result. In the processing control unit 203, the processor core 232 and the logic circuit 233 are configured as functional units that execute predetermined processing. The common unit 231 refers to the management DB 3 and determines predetermined processing executed in the processor core 232 and the logic circuit 233 and program data and circuit data used in corresponding predetermined processing.

The program data and the circuit data, which are stored in the processing DB 4, are read from the processing DB 4 as necessary. The program data is used for each operation of the corresponding processor core 232, and the circuit data is used for the configuration of the logic circuit 233. The map DB 5 stores map information, and is used in surrounding recognition processing (details will be described later) that is one piece of predetermined processing in the present embodiment. The storage unit 235 included in the common unit 231 stores a result of predetermined processing executed in the processor core 232 and the logic circuit 233.

<Processing Configuration Example of Processing Control Unit>

Figure 4A:
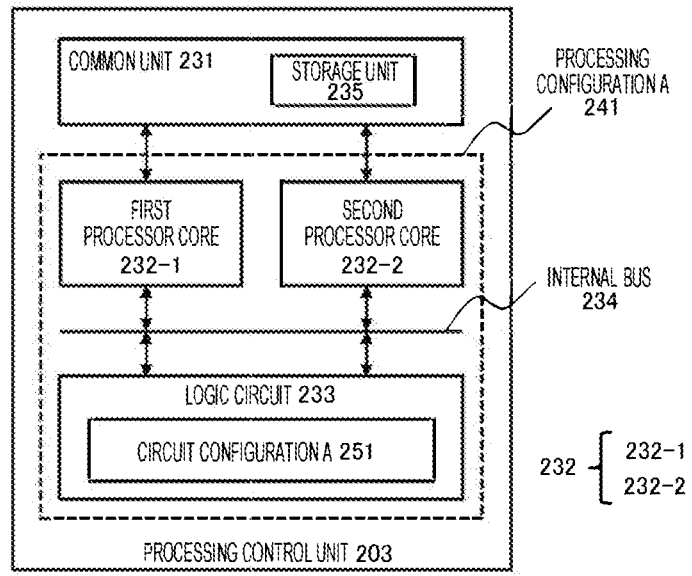
FIG. 4(*a*) is a diagram illustrating a non-redundant processing configuration, and FIG. 4(*b*) is a diagram illustrating a redundant processing configuration.
Figure 4B:
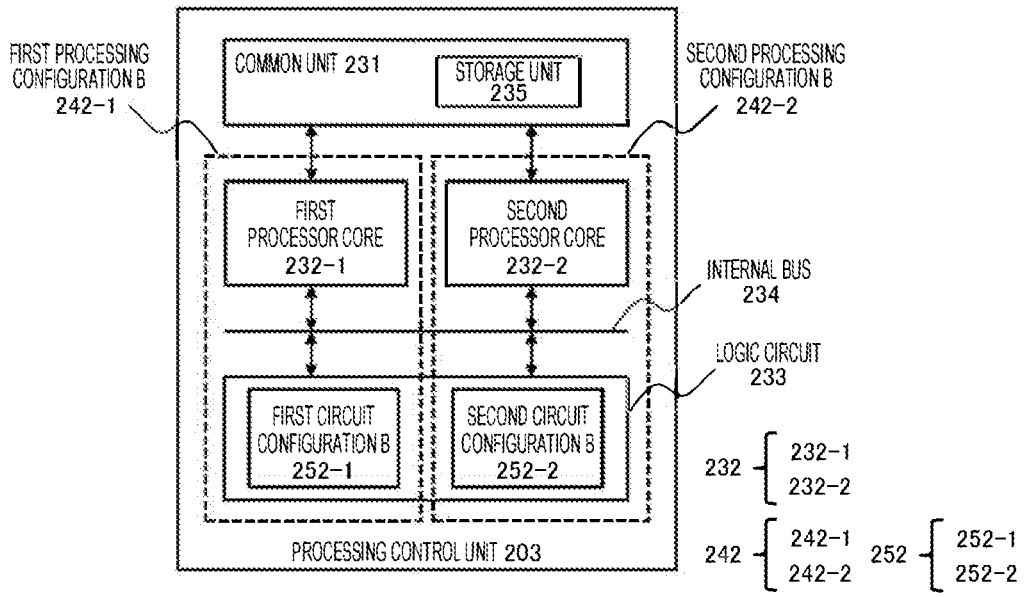

FIGS. 4(a) and 4(b) are diagrams illustrating a configuration example of the processing control unit 203. FIG. 4(a) is a diagram illustrating a configuration example in which the processor core 232 performs non-redundant parallel processing by utilizing the entire logic circuit 233. FIG. 4(b) is a diagram illustrating a configuration example in which each core of the processor core 232 performs redundant processing by individually utilizing the divided logic circuit 233. Since redundant processing is not performed in the configuration illustrated in FIG. 4(a), it can be said that the configuration illustrated in FIG. 4(a) is a configuration for performing non-redundant processing in comparison with the configuration illustrated in FIG. 4(b). For this reason, hereinafter, the configuration illustrated in FIG. 4(a) is referred to as "non-redundant processing configuration", and the configuration illustrated in FIG. 4(b) is referred to as "redundant processing configuration". In the present embodiment, in the processing control unit 203, configurations of functional units of the processor core 232 or the processor core 232 and the logic circuit 233 are switched for non-redundant processing and redundant processing.

Note that, even in a case where the logic circuit 233 is divided into a plurality of parts as illustrated in FIG. 4(b), in a case where a first circuit configuration B 252-1 and a second circuit configuration B 252-2 perform different pieces of processing, for example, in a case where one processes output of the camera and the other processes output of the laser, the configuration is treated as a non-redundant processing configuration. However, in order to distinguish from the configuration illustrated in FIG. 4(a), hereinafter, this is referred to as "second non-redundant processing configuration", and the configuration illustrated in FIG. 4(a) is referred to as "first non-redundant processing configuration". The "non-redundant processing configuration" is a superordinate concept of the "first non-redundant processing configuration" and the "second non-redundant processing configuration".

In FIG. 4(a), as a processing configuration A 241, an example in which predetermined processing is performed by utilizing the entire first processor core 232-1, second processor core 232-2, and logic circuit 233 is shown. The first processor core 232-1 and the second processor core 232-2 perform non-redundant processing, and further utilize the logic circuit 233 as an accelerator via the internal bus 234. At this time, the logic circuit 233 constitutes one accelerator circuit as a circuit configuration A 251.

In FIG. 4(b), as a processing configuration B 242 in which a first processing configuration B 242-1 and a second processing configuration B 242-2 are combined, a configuration example in which each core of the processor core 232 executes redundant processing by individually utilizing the logic circuit 233 divided into two. The first processor core 232-1 is used in the first processing configuration B 242-1, and the second processor core 232-2 is used in the second processing configuration B 242-2 to perform redundant processing.

Each of the first processor core 232-1 and the second processor core 232-2 utilizes the logic circuit 233 as an accelerator via the internal bus 234. At this time, in the logic circuit 233, the first circuit configuration B 252-1 and the second circuit configuration B 252-2 are combined into a circuit configuration B 252, the first circuit configuration B 252-1 constitutes an accelerator circuit of the first processor core 232-1, and the second circuit configuration B 252-2 constitutes an accelerator circuit of the second processor core 232-2. Note that a circuit including the first circuit configuration B 252-1 and the second circuit configuration B 252-2 preferably uses a circuit region physically separated in the logic circuit 25 in consideration of hardware reliability.

In FIG. 4(b), the processing control unit 203 compares results of redundant processing individually executed in the first processing configuration B 242-1 and the second processing configuration B 242-2, so as to improve reliability for determination of the presence or absence of abnormality and validity of a result, and the like in predetermined processing.

To make sure, in the non-redundant processing configuration illustrated in FIG. 4(a), the first processor core 232-1 and the second processor core 232-2 execute different pieces of processing. In the redundant processing configuration illustrated in FIG. 4(b), the first processor core 232-1 and the second processor core 232-2 execute the same processing. That is, in the redundant processing configuration illustrated in FIG. 4(b), program data executing the same processing is read into the first processor core 232-1 and the second processor core 232-2. Note that the same processing is processing of outputting the same output data with respect to certain input data.

The first circuit configuration B 252-1 and the second circuit configuration B 252-2 execute the same processing. That is, the first circuit configuration B 252-1 and the second circuit configuration B 252-2 output the same output data with respect to certain input data. The first circuit configuration B 252-1 and the second circuit configuration B 252-2 may differ in a use method of specific hardware resources inside logic circuits such as a lookup table, flip-flop, internal memory, and operation unit.

<Vehicle Surrounding Prediction>

Figure 5A:
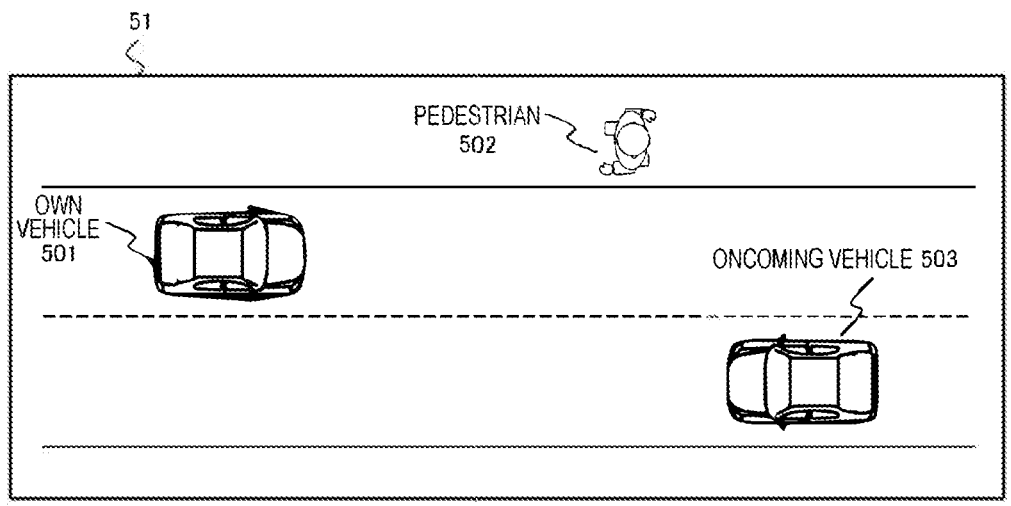
FIG. 5 is a diagram illustrating a relationship between surrounding recognition processing, behavior prediction processing, and track plan processing.
Figure 5B:
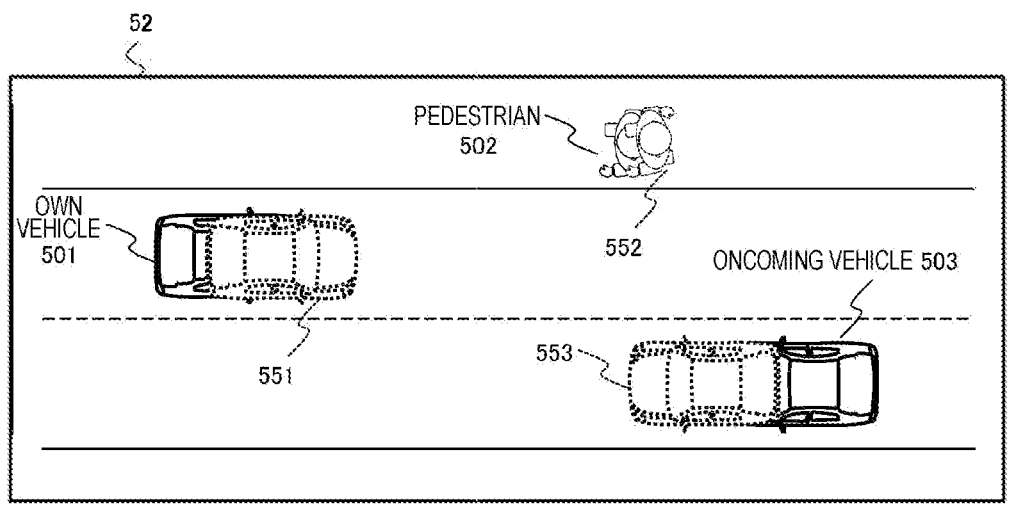

FIGS. 5(a) and 5(b) are diagrams illustrating a relationship between surrounding recognition processing, behavior prediction processing, and track plan processing. FIG. 5(a) is a diagram illustrating an example of an own vehicle surrounding map 51 at time T. FIG. 5(b) is a diagram illustrating an example of an own vehicle surrounding prediction map 52 at time T+1 calculated at the time T.

In the present embodiment, the processing control unit 203 performs surrounding recognition processing, behavior prediction processing, and track plan processing as the predetermined processing described above. In the surrounding recognition processing, the processing control unit 203 recognizes an object around the own vehicle on the basis of sensor information received from the information acquisition unit 202 and map information acquired from the map DB 5. In the behavior prediction processing, the processing control unit 203 performs behavior prediction of each object around the own vehicle on the basis of a recognition result of an object around the own vehicle by the surrounding recognition processing. Examples of systems of prediction include a system of obtaining a future position by extrapolating the future position based on the current position and velocity of each surrounding object. In the track plan processing, the processing control unit 203 generates a predicted track of the own vehicle on the basis of a predicted position in each surrounding object. The processing control unit 203 generates a control command value that satisfies a predicted track of the own vehicle on the basis of these processing results.

FIG. 5(a) illustrates an example of a recognition result of an object around the own vehicle at the time T executed in the surrounding recognition processing. The processing control unit 203 integrates position, size, moving speed information, and the like of an object around the own vehicle on the basis of the sensor information at the time T, maps the object around the own vehicle on the map information acquired from the map DB 5, and creates the own vehicle surrounding map 51 at the time T. In FIG. 5(a), it is assumed that a pedestrian position 502 and another vehicle position 503 are mapped on the own vehicle surrounding map 51 in addition to an own vehicle position 501.

FIG. 5(b) illustrates an example of a behavior prediction result of each object around the own vehicle and a predicted track result of the own vehicle at the time T+1 executed in the behavior prediction processing and the track plan processing. The processing control unit 203 predicts the time T+1 and later on the basis of the result at the time T described in FIG. 5(a). In FIG. 5(b), it is assumed that a predicted pedestrian position 552 and a predicted another vehicle position 553 are mapped on the own vehicle surrounding prediction map as the behavior prediction result and a predicted own vehicle position 551 is mapped on the own vehicle surrounding prediction map 52 as the predicted track plan result of the own vehicle.

Note that, in FIG. 5(b), a predicted position at the time T+1 is indicated by a dotted line, and a recognition result at the time T described in FIG. 5(a) is indicated by a solid line. However, these actual positions are not necessarily included in an actual prediction result. Further, although only one predicted position of each object is illustrated in FIG. 5(b), such predicted positions of each object are generated as many as necessary for generating a predicted track of the own vehicle. For example, in a case where a track for 10 seconds is predicted every 100 milliseconds, the processing control unit 203 generates 100 predicted positions for each object.

Further, in the determination processing, for example, the processing control unit 203 compares a predicted position of an object around the own vehicle at the time T+1 predicted from a recognition result of the object around the own vehicle at the time T with a recognition result of the object around the own vehicle at the time T+1 to determine the presence or absence of abnormality and the validity of the calculation result, that is, the presence or absence of abnormality, from the degree of deviation of the position information and the like. In the determination processing, for example, the processing control unit 203 determines that there is no abnormality when the deviation of the position information is within a predetermined threshold, and determines that there is abnormality when the deviation of the position information is larger than the threshold.

<Management Database Information>

FIG. 6 is a diagram illustrating an example of the management DB 3. The management DB 3 is a database having a plurality of records. The information stored in the management DB 3 is created in advance by an operator or the like. The management DB 3 is referred to by the processing control unit 203 via the common unit 231. In each record of the management DB 3, a name of processing executed by the processing control unit 203, a processing configuration of the processing control unit 203 according to processing, program data executed by the processor core 232, and information of circuit data configured on the logic circuit 233 are stored.

Since the processing control unit 203 reads the records stored in the management DB 3 from the top and executes the records in order, the order of the records described in the management DB 3 indicates the order of processing. However, the configuration of the management DB 3 illustrated in FIG. 6 is merely an example, and for example, information clearly indicating the execution order may be included in each record of the management DB 3, and the processing control unit 203 may execute the processing according to the execution order included in each record without depending on the description order or the reading order of the management DB 3.

The management DB 3 has fields of a name 601, a processing configuration 602, a processor operation 603, and a logic circuit 604. A name of processing to be executed is stored in the field of the name 601. The field of the processing configuration 602 stores a configuration type of the processing control unit 203, that is, either the processing configuration A 241 or the processing configuration B 242. The field of the processor operation 603 stores information of program data of an operation executed by the processor core 232. Information of circuit data constituting the logic circuit 233 is stored in the field of the logic circuit 604.

In the example illustrated in FIG. 6, names that are easy to understand are described for the sake of explanation. However, in actuality, any information may be used as long as the information can be discriminated. For example, one letter of an alphabet or a number may be stored in the field of the name 601, and a boolean value such as 0/1 may be stored in the field of the processing configuration 602. An address at which data to be read is stored may be stored in the fields of the processor operation 603 and the logic circuit 604.

In the example illustrated in FIG. 6, in the field of the name 601, "surrounding recognition processing", "determination processing", "behavior prediction processing", and "track plan processing" are stored in this order from the top. For this reason, the processing control unit 203 firstly executes the surrounding recognition processing, secondly executes the determination processing, thirdly executes the behavior prediction processing, and fourthly executes the track plan processing. Note that a result of the "behavior prediction processing" and a result of the "track plan processing" are stored in the storage unit 235.

In the "surrounding recognition processing" indicated in the first record, the "processing configuration A" in which the processor core 232 performs non-redundant processing by utilizing the entire logic circuit 233 is indicated in the field of the processing configuration 602, information of program data for the processor core 232 to perform surrounding recognition processing operation is indicated in the field of the processor operation 603, and information of circuit data of the circuit configuration A 251 in which the logic circuit 233 constitutes a surrounding recognition processing circuit is indicated in the field of the logic circuit 604.

In the "determination processing" indicated in the second record, the "processing configuration B" in which each core of the processor core 232 performs redundant processing by individually utilizing the divided logic circuit 233 is indicated in the field of the processing configuration 602, information of program data for the first processor core 232-1 to perform the first determination processing operation and information of program data for the second processor core 232-2 to perform the second determination processing operation are indicated in the field of the processor operation 603, and information of circuit data of the first circuit configuration B 252-1 constituting the first determination processing circuit and information of circuit data of the second circuit configuration B 252-2 constituting the second determination processing circuit in the logic circuit 233 are indicated in the field of the logic circuit 604.

In the "behavior prediction processing" indicated in the third record, the "processing configuration A" is indicated in the field of the processing configuration 602, information of program data for the processor core 232 to perform the behavior prediction processing operation is indicated in the field of the processor operation 603, and information of circuit data of the circuit configuration A 251 in which the logic circuit 233 constitutes the behavior prediction processing circuit is indicated in the field of the logic circuit 604.

In the "track plan processing" indicated in the fourth record, the "processing configuration A" is indicated in the field of the processing configuration 602, information of program data for the processor core 232 to perform the track plan processing operation is indicated in the field of the processor operation 603, and information of circuit data of the circuit configuration A 251 in which the logic circuit 233 constitutes the track plan processing circuit is indicated in the field of the logic circuit 604.

<Operation Flowchart>

Figure 7:
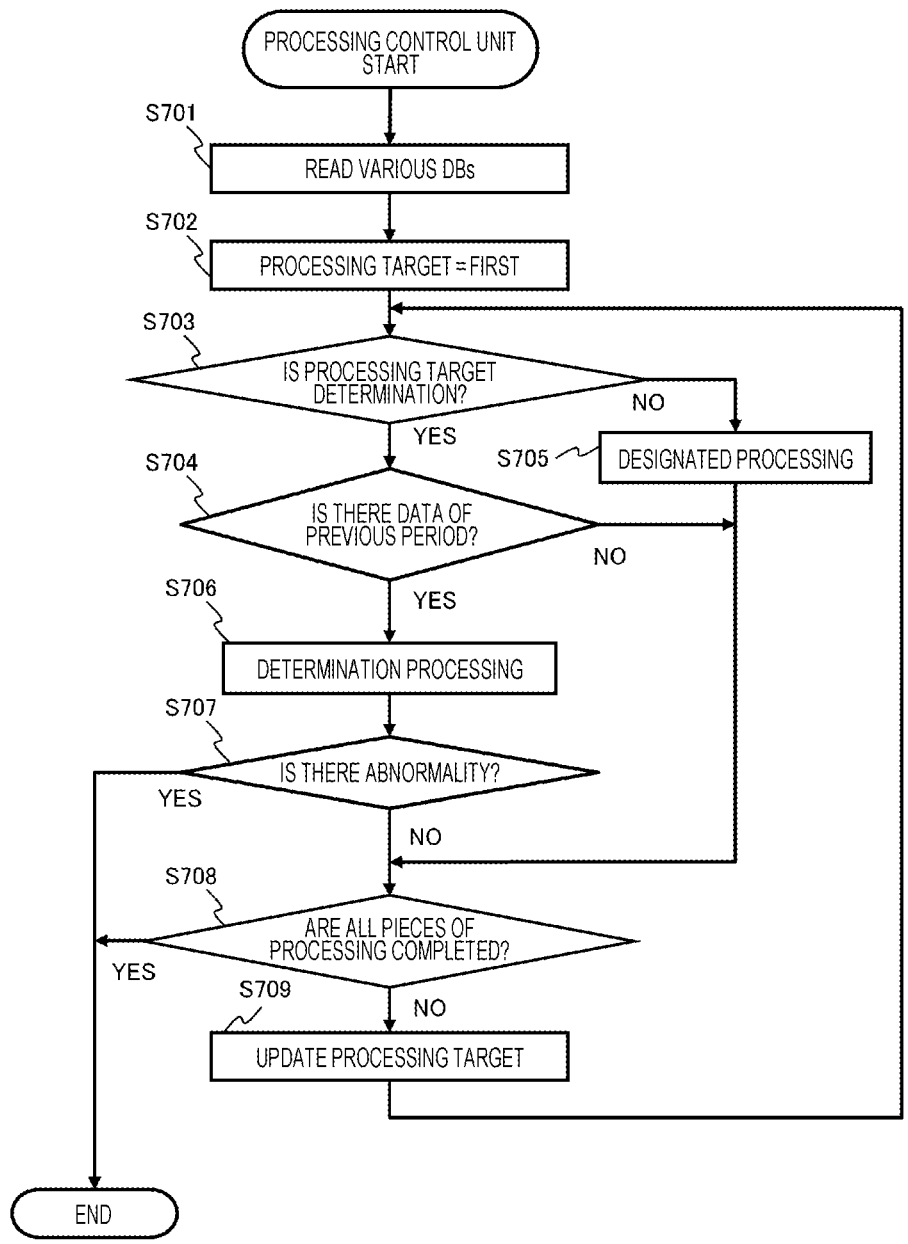
FIG. 7 is a flowchart illustrating an operation outline of a processing control unit 203.

FIG. 7 is a flowchart illustrating an operation outline of the processing control unit 203. The processing control unit 203 acquires information from the information acquisition unit 202 at a predetermined processing period, for example, every 100 milliseconds, and executes the processing illustrated in FIG. 7. That is, the processing illustrated in FIG. 7 is processing executed in one processing period, and in actuality, the processing illustrated in FIG. 7 is repeatedly executed.

First, in Step S701, the processing control unit 203 reads various DBs, that is, the management DB 3, the processing DB 4, and the map DB 5. In subsequent Step S702, the processing control unit 203 sets a first record of the management DB 3 read in Step S701 as a processing target. In subsequent Step S703, the processing control unit 203 determines whether or not the processing target is the determination processing, and proceeds to Step S704 when determining that the processing target is the determination processing, or proceeds to Step S705 when determining that the processing target is not the determination processing.

In Step S704, the processing control unit 203 determines whether data of the previous period exists, in other words, whether a behavior prediction processing result and a track plan processing result in the previous processing period are stored in the storage unit 235. The processing control unit 203 proceeds to Step S706 when determining that the data of the previous period exists, and proceeds to Step S708 when determining that the data of the previous period does not exist. For example, in a case where the processing illustrated in FIG. 7 is executed for the first time, such as immediately after an ignition key of the vehicle 100 is turned on, a behavior prediction processing result or a track plan processing result is not stored in the storage unit 235, and thus, negative determination is made in Step S704.

In Step S705, the processing control unit 203 executes processing designated in the record as the processing target, and proceeds to Step S708. The processing of Step S705 will be described in detail below. The processing control unit 203 loads a program into the processor core 232 on the basis of the description of the field of the processor operation 603 in the record as the processing target to execute the program. Furthermore, the processing control unit 203 reconfigures the logic circuit 233 on the basis of the description of the field of the logic circuit 604 in the record as the processing target and causes an operation to be executed. Note that, in a case where only one piece of program data is described in the field of the processor operation 603, the processor core 232 executes the same program, and in a case where two pieces of program data are described in the field of the processor operation 603, the processor core 232 executes different programs.

Further, in a case where only one piece of circuit data is described in the field of the logic circuit 604, one piece of processing is executed by the entire logic circuit 233, and in a case where a plurality of pieces of circuit data are described in the field of the logic circuit 604, the logic circuit 233 is divided into a plurality of regions and different pieces of processing are executed in the regions. The above is the detailed description of Step S705.

In Step S706, similarly to Step S705, the processing control unit 203 executes processing designated in the record as the processing target, that is, the determination processing, and proceeds to Step S707. Note that, although the execution procedure of Step S706 itself is the same as Step S705, the determination processing is redundantly executed in both the first processing configuration B 242-1 and the second processing configuration B 242-2 as described above.

In this determination processing, for example, a deviation between a recognition result of an object around the own vehicle in the current processing period and a predicted position in the current processing period predicted from a recognition result of the object around the own vehicle in the previous processing period is calculated. Furthermore, in the determination processing, it is determined that there is no abnormality when the calculated deviation is within a predetermined threshold and that there is abnormality when the deviation is larger than the threshold, and the determination result is stored in the storage unit 235. As described above, since the determination processing is redundantly executed in both the first processing configuration B 242-1 and the second processing configuration B 242-2, each of the execution results is stored in the storage unit 235.

In subsequent Step S707, the common unit 231 of the processing control unit 203 determines the presence or absence of abnormality on the basis of the determination results of the first processing configuration B 242-1 and the second processing configuration B 242-2. The common unit 231 determines that there is no abnormality as a verification result in a case where both of the two determination results indicate absence of abnormality, and determines that there is abnormality as a verification result in a case where both the two determination results indicate presence of abnormality and in a case where the two determination results are different. When determining that there is abnormality, the processing control unit 203 ends the processing illustrated in FIG. 7, and when determining that there is no abnormality, the processing proceeds to Step S708. However, when determining that there is abnormality, the processing control unit 203 may keep a record of the detection of the abnormality, or may notify another device mounted on the vehicle 100 of the detection of the abnormality via the second communication IF 201-2.

In Step S708, the processing control unit 203 determines whether processing of all records described in the management DB 3 is completed. The processing control unit 203 ends the processing illustrated in FIG. 7 when determining that all the processing is completed, and proceeds to Step S709 when determining that there is an unprocessed record. In Step S709, the processing control unit 203 updates, among the records described in the management DB 3, an unprocessed record that is earliest in the processing order to the processing target, and returns to Step S703.

<Operation Sequence>

Figure 8:
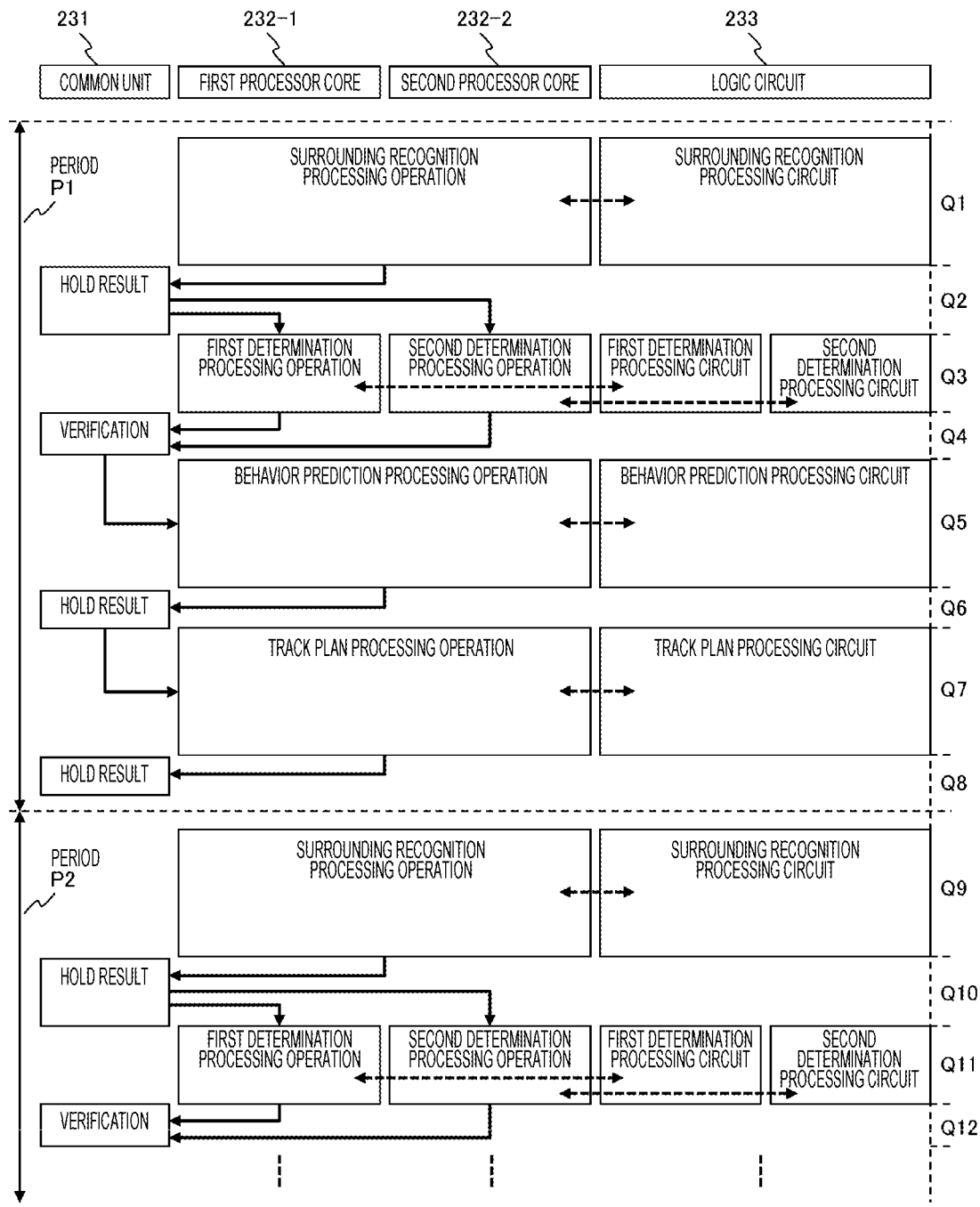
FIG. 8 is a sequence diagram illustrating operation details of the processing control unit 203.

FIG. 8 is a sequence diagram illustrating details of the operation of the processing control unit 203. FIG. 8 illustrates operations of the common unit 231, the processor core 232, and the logic circuit 233 in a case where the management DB 3 is as illustrated in FIG. 6. In FIG. 8, time elapses from the upper part to the lower part in the diagram. For convenience of description, Q1 to Q12 indicating time zones are used as illustrated at the right end of FIG. 8. A larger number following "Q" indicates a later time zone. However, the lengths of the time zones may be different.

In FIG. 8, according to the description of the management DB 3 illustrated in FIG. 6, the processing control unit 203 performs the surrounding recognition processing, the behavior prediction processing, and track generation processing by a non-redundant processing configuration, and stores a result of the processing in the storage unit 235 of the common unit 231. Further, the processing control unit 203 ensures reliability of the determination result by performing the determination processing of a stored result by the redundant processing configuration.

Note that, although FIG. 8 illustrates only a part of a processing period P1 and a processing period P2 following the processing period P1, the rest of the processing period P2 and a further processing period following the processing period P2 are similarly executed. The period P1 is a first period, the period P2 is a second period, and the processing time of these periods follows the processing period P.

In FIG. 8, first, the processor core 232 and the logic circuit 233 constitute the processing configuration A and perform the surrounding recognition processing (time zone Q1). The processor core 232 performs non-redundant processing of the surrounding recognition processing operation, and utilizes the logic circuit 233 configured by the surrounding recognition processing circuit as an accelerator. When the surrounding recognition processing is finished, the first processor core 232-1 and the second processor core 232-2 transmit a processing result to the common unit 231, and the common unit 231 holds the result in the storage unit 235. Note that, in consideration of reliability, the processing result may be redundantly held in the storage unit 235.

When result transmission to the common unit 231 is finished, the processor core 232 and the logic circuit 233 change the configuration from the processing configuration A to the processing configuration B in order to perform the determination processing (time zone Q2). Specifically, program data and circuit data for the determination processing are acquired from the processing DB 4, and loading into the processor core and rewriting of the logic circuit 233 are performed. The processor core 232 acquires a held result from the common unit 231, and performs redundant processing of the determination processing operation. Note that the held result is specifically a behavior prediction processing result and a track plan processing result of a period before the period P1, and a surrounding recognition processing result of the period P1. Further, the processor core 232 individually utilizes the logic circuit 233 including a determination processing circuit divided into two as an accelerator (time zone Q3).

Upon completion of the determination processing, the processor core 232 transmits a result to the common unit 231, and the common unit 231 verifies whether or not the two determination results are the same (time zone Q4). For example, in Step S705 illustrated in FIG. 7, the processing control unit 203 determines whether or not abnormality is determined in the determination processing. The common unit 231 determines that there is no abnormality as a verification result in a case where both of the two determination results indicate absence of abnormality, and determines that there is abnormality as a verification result in a case where both the two determination results indicate presence of abnormality and in a case where the two determination results are different. In a case where there is determined to be abnormality as the verification result, the processing in the period P1 ends. However, here, the description will be continued assuming that there is determined to be no abnormality.

In the time zone Q4, in order to perform the next behavior prediction processing, the processor core 232 and the logic circuit 233 acquire program data and circuit data for the determination processing from the processing DB 4, and perform loading into the processor core 232 and rewriting of the logic circuit 233. Then, the processor core 232 acquires a surrounding recognition processing result in the processing period P1 from the common unit 231. The processor core 232 performs non-redundant processing of the behavior prediction processing operation, and utilizes the logic circuit 233 configured by the behavior prediction processing circuit as an accelerator (time zone Q5). When the behavior prediction processing is finished, the processor core 232 transmits a processing result to the common unit 231, and the common unit 231 holds the result in the storage unit 235.

When result transmission to the common unit 231 is finished, the processor core 232 and the logic circuit 233 prepare for next processing by maintaining the processing configuration A as the configuration in order to perform next track plan processing. Specifically, the processor core 232 and the logic circuit 233 read the program data acquired from the processing DB 4 and reconfigure the logic circuit 233 using the circuit data (time zone Q6). Upon acquiring the surrounding recognition processing result and the behavior prediction processing result in the processing period P1 from the common unit 231, the processor core 232 performs non-redundant processing of the track plan processing operation and utilizes the logic circuit 233 configured by the track plan processing circuit as an accelerator (time zone Q7). When the surrounding recognition processing is finished, the processor core 232 transmits a processing result to the common unit 231, and the common unit 231 holds the result in the storage unit 235.

When the result transmission to the common unit 231 is finished, the processor core 232 and the logic circuit 233 change the program data and the circuit data acquired from the processing DB 4 for the surrounding recognition processing by maintaining the processing configuration A as the configuration in order to perform the surrounding recognition processing in the next period P2 (Q8). The above time zones from Q1 to Q8 are in the processing period P1, and the processing control unit 203 outputs a control command value so as to satisfy a result of the track plan processing.

Next, similarly to the time zones Q1 to Q8, the common unit 231, the processor core 232, and the logic circuit 233 start the processing of the processing period P2 from a time zone Q9. Since the processing of the processing period P2 is similar to the processing period P1, detailed description of the time zones Q9 to Q12 is omitted. However, in the time zone Q11, held results acquired from the storage unit 235 are the behavior prediction processing result and the track plan processing result of the processing period P1, and the surrounding recognition processing result of the processing period P2. The above is the description of the operation illustrated in FIG. 8.

As described above, according to the present embodiment, the surrounding recognition processing, the behavior prediction processing, and the track plan processing in the automatic driving are increased in speed by the non-redundant processing, and the redundant processing is performed only for the determination processing, so that reliability can be improved. Further, the processing configuration for the non-redundant processing and the processing configuration for the redundant processing can be switched and controlled according to the processing. Therefore, according to the present embodiment, it is possible to provide a configuration in which the non-redundant processing and the redundant processing can be efficiently performed by changing the target and range of the redundant processing for monitoring or the like according to the required reliability and processing time.

According to the first embodiment described above, an action and an effect below can be obtained.

(1) The autonomous traveling control device 2 which is an electronic control device includes the processing control unit 203 and the information acquisition unit 202. The information acquisition unit 202 collects external environment information and transfers the external environment information to the processing control unit 203. The processing control unit 203 includes the first processor core 232-1, the second processor core 232-2, and the storage unit 235. The processing control unit 203 executes arithmetic processing by a non-redundant processing configuration that executes non-redundant processing using the first processor core 232-1 and the second processor core 232-2 as illustrated in FIG. 4(*a*) and arithmetic processing by a redundant processing configuration that executes redundant processing using the first processor core 232-1 and the second processor core 232-2 as illustrated in FIG. 4(*b*). The processing control unit 203 stores a result of the arithmetic processing by the non-redundant processing configuration in the storage unit 235, individually performs arithmetic processing using the result stored in the storage unit 235 in both the first processor core 232-1 and the second processor core 232-2 by arithmetic processing by the redundant processing configuration, that is, the determination processing, and performs determination for an arithmetic processing result by the non-redundant processing configuration based on an arithmetic result by the first processor core 232-1 and an arithmetic result by the second processor core 232-2. For this reason, by appropriately switching between the non-redundant processing configuration and the redundant processing configuration, determination by the redundant configuration can be realized at low cost.

(2) The determination is abnormality presence/absence determination of a result of arithmetic processing by the non-redundant processing configuration. For this reason, it is possible to determine the presence or absence of abnormality of the high-speed operation at low cost by the non-redundant processing configuration by a highly reliable redundant configuration.

(3) The processing control unit 203 includes the reconfigurable logic circuit 25. The logic circuit 25 executes processing together with the first processor core 232-1 and the second processor core 232-2 in the non-redundant processing configuration, and divides a circuit into two regions by reconfiguration in the redundant processing configuration and executes processing individually by causing the first processor core 232-1 and the first circuit configuration B 252-1 and the second processor core 232-2 and the second circuit configuration B 252-2 to be redundant. For this reason, the processing control unit 203 can have a redundant configuration including a logic circuit.

(4) The determination is performed in the first processor core 232-1 or the second processor core 232-2. For this reason, the processing control unit 203 can execute determination without using an additional processor.

(First Variation)

In the first embodiment described above, the processing control unit 203 has the processing configuration B in which the redundant processing is performed only in the determination processing. However, other surrounding recognition processing, behavior prediction processing, and track plan processing may be executed in the processing configuration B. For example, as the processing configuration A for rewriting the management DB 3 and performing the non-redundant processing, there may be a case where the effect of increase in speed by the non-redundant processing is small or a case where it takes time to change the processing configuration.

<Management Database Information>

Figure 9:
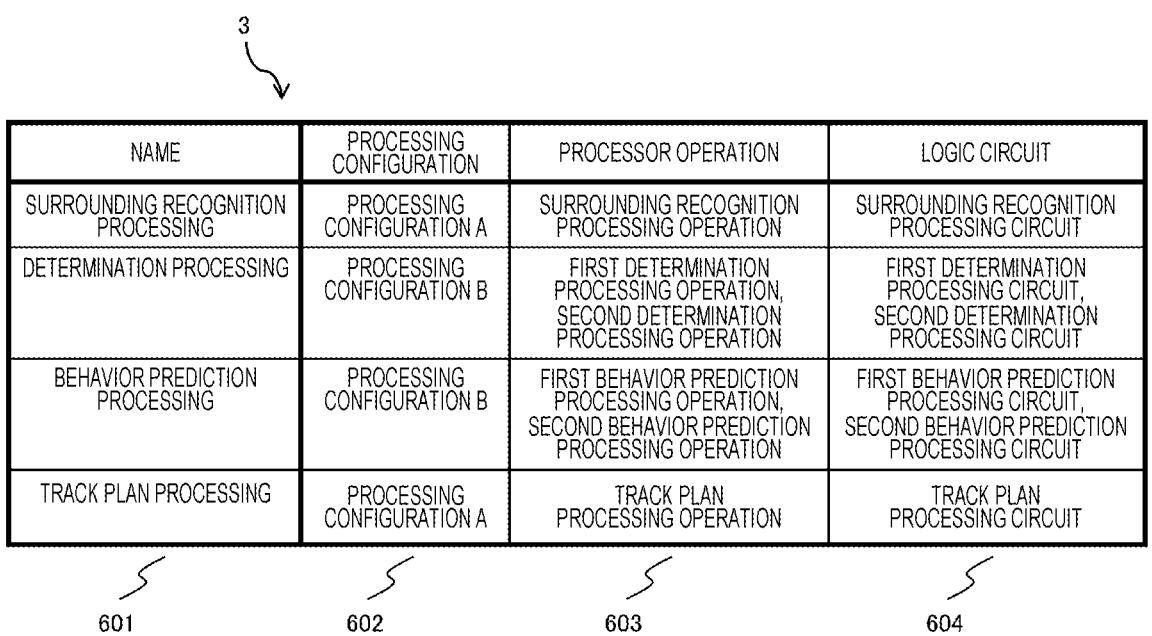
FIG. 9 is a diagram illustrating an example of the management database 3 in a first variation.

FIG. 9 is a diagram illustrating an example of the management database 3 in a first variation. That is, FIG. 9 corresponds to FIG. 6 in the first embodiment described above. In FIG. 9, as compared with FIG. 6, whether the processing configuration 602 in the behavior prediction processing is the processing configuration A or the processing configuration B is different. In FIG. 9, the processing configuration 602 in the behavior prediction processing is the processing configuration B.

In the "behavior prediction processing" of the example illustrated in FIG. 9, the processing configuration B is denoted by reference numeral 602, the information of the program data for the first processor core 232-1 to perform the first behavior prediction processing operation and the information of the program data for the second processor core 232-2 to perform the second behavior prediction processing operation are denoted by reference numeral 603, and the information of the circuit data of the first circuit configuration B 252-1 constituting the first behavior prediction processing circuit and the information of the circuit data of the second circuit configuration B 252-2 constituting the second behavior prediction processing circuit in the logic circuit 233 are denoted by reference numeral 604.

<Operation Sequence>

Figure 10:
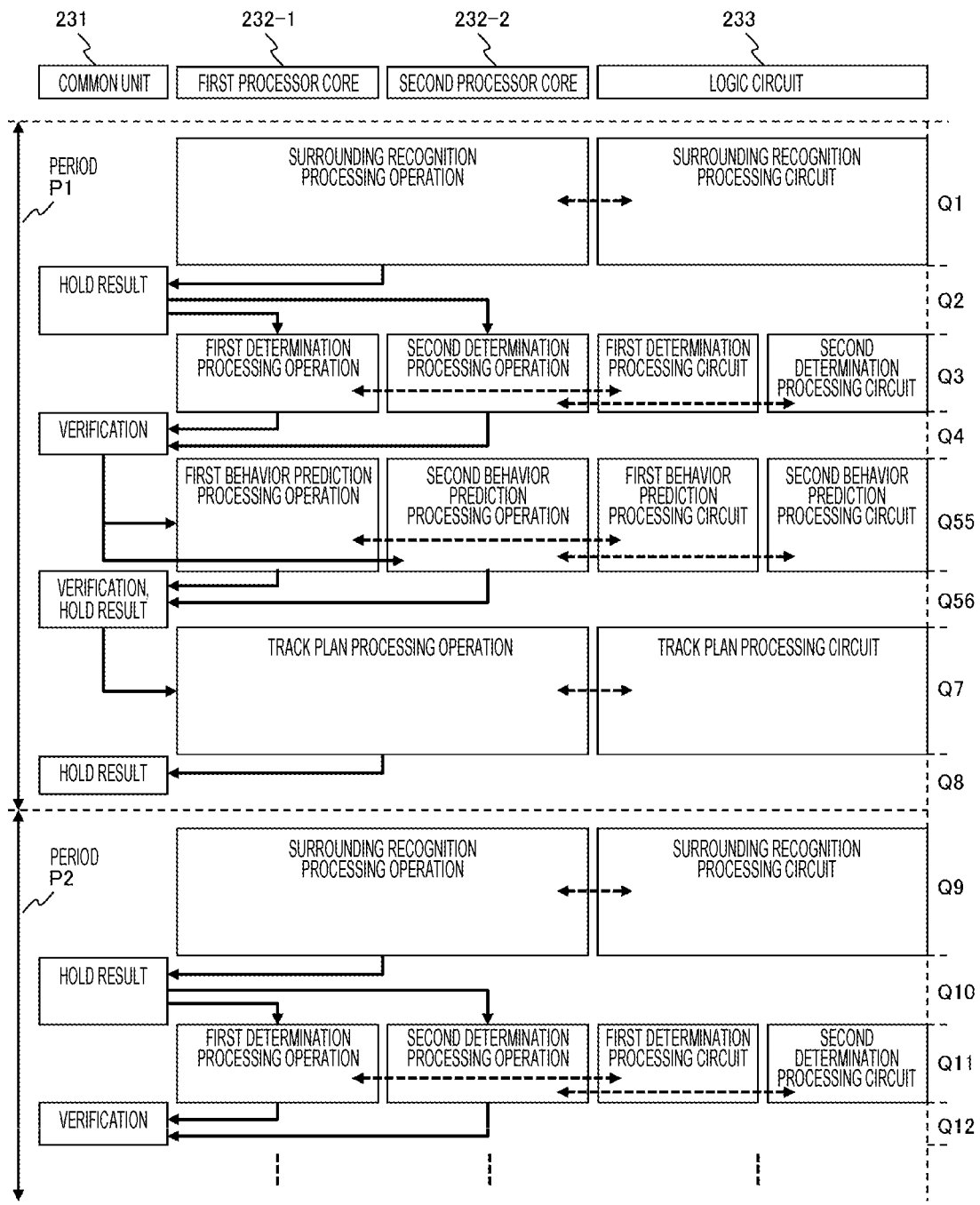
FIG. 10 is a sequence diagram illustrating operation details of the processing control unit 203 in the first variation.

FIG. 10 is a sequence diagram illustrating details of the operation of the processing control unit 203 in the first variation. That is, FIG. 10 corresponds to FIG. 8 in the first embodiment described above. In FIG. 10, the processing configuration 602 in the behavior prediction processing is the processing configuration B. The processing in the time zones Q1 to Q4 and Q7 to Q12 is similar to that in FIG. 8, and is omitted from description. In the time zone Q4, in order to perform the next behavior prediction processing, the processor core 232 and the logic circuit 233 change the program data and the circuit data acquired from the processing DB 4 for the behavior prediction processing by maintaining the processing configuration B.

The first processor core 232-1 and the second processor core 232-2 acquire the surrounding recognition processing result of the processing period P1 from the common unit 231, and perform redundant processing for the behavior prediction processing operation. Further, the logic circuit 233 including the behavior prediction processing circuit divided into two is individually utilized as an accelerator (time zone Q55). The first processor core 232-1 and the second processor core 232-2 transmit a result to the common unit 231 when the behavior prediction processing is finished. When the result transmission to the common unit 231 is finished, the processor core 232 and the logic circuit 233 change the configuration from the processing configuration B to the processing configuration A and change the program data and the circuit data acquired from the processing DB 4 for the track plan processing in order to perform the next track plan processing (time zone Q56).

(Second Variation)

In the first embodiment described above, the processing control unit 203 uses two of the processor cores 232 for operation of the predetermined processing. However, three or more processor cores may be used for the operation.

<Processing Configuration Example of Processing Control Unit>

Figure 11A:
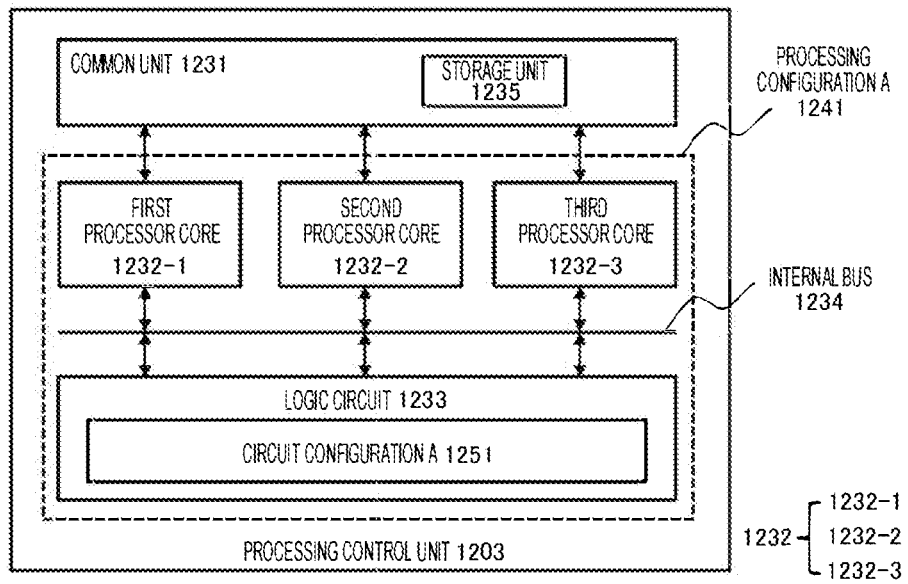
FIG. 11 is a diagram illustrating a configuration example of a processing control unit 1203 in the second variation.
Figure 11B:
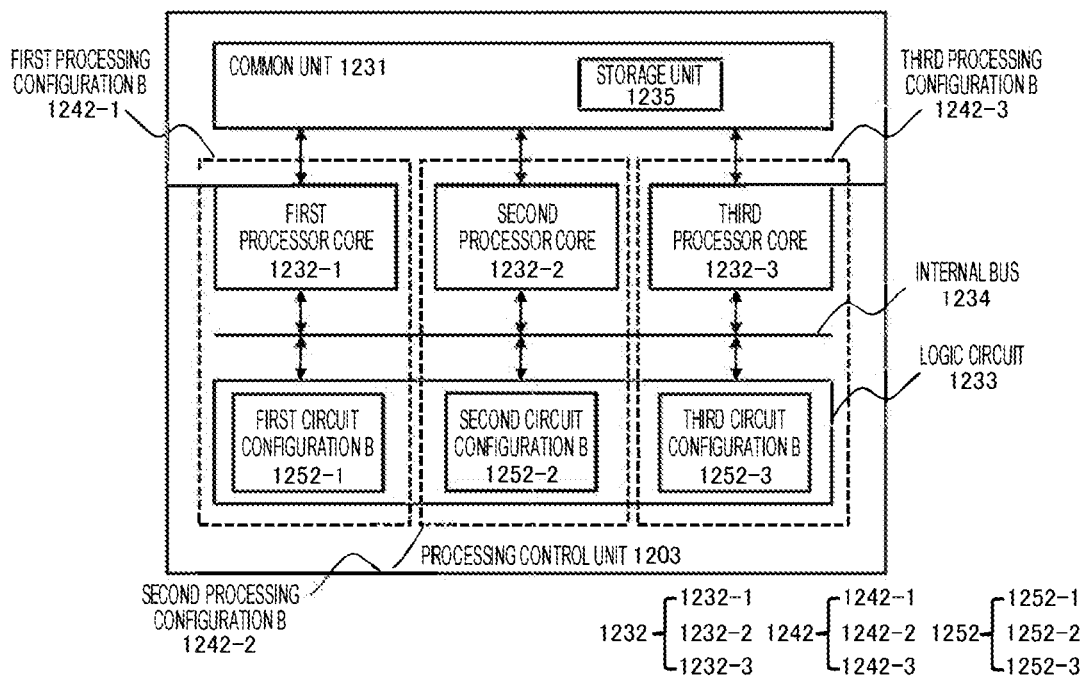

FIGS. 11(a) and 11(b) are diagrams illustrating a configuration example of a processing control unit 1203 in a second variation. In the present variation, the processing control unit 1203 includes three processor cores, a first processor core 1232-1, a second processor core 1232-2, and a third processor core 1232-3. Hereinafter, the first processor core 1232-1, the second processor core 1232-2, and the third processor core 1232-3 are collectively referred to as the "processor core 1232".

FIG. 11(a) is a diagram illustrating a configuration example in which the processor core 1232 performs non-redundant processing by utilizing an entire logic circuit 1233. FIG. 11(b) is a diagram illustrating a configuration example in which each core of the processor core 1232 performs redundant processing by individually utilizing the divided logic circuit 1233. That is, FIGS. 11(a) and 11(b) correspond to FIGS. 4(a) and 4(b) in the first embodiment described above, and illustrates an example in which three processor cores are used for operation of predetermined processing.

In FIG. 11(a), as a processing configuration A 1241, an example in which predetermined processing is performed by utilizing the entire first processor core 1232-1, second processor core 1232-2, third processor core 1232-3, and logic circuit 233 is shown. The first processor core 1232-1, the second processor core 1232-2, and the third processor core 1232-3 perform different processing, that is, non-redundant processing. Further, these three processor cores utilize the logic circuit 1233 as an accelerator via an internal bus 1234. At this time, the logic circuit 1233 constitutes one accelerator circuit as a circuit configuration A 1251. However, the logic circuit 1233 may be divided into a plurality of regions, and circuits configured in the regions may function as accelerators of different processor cores.

In FIG. 11(b), as a processing configuration B 1242 in which a first processing configuration B 1242-1, a second processing configuration B 1242-2, and a third processing configuration B 1242-3 are combined, a configuration example in which each core of the processor core 1232 executes redundant processing by individually utilizing the logic circuit 1233 divided into three. The first processor core 1232-1 is used in the first processing configuration B 1242-1, the second processor core 1232-2 is used in the second processing configuration B 1242-2, and the third processor core 1232-3 is used in the third processing configuration B 1242-3 to perform redundant processing. Each of the first processor core 1232-1, the second processor core 1232-2, and the third processor core 1232-3 utilizes the logic circuit 1233 as an accelerator via the internal bus 1234.

At this time, in the logic circuit 1233, the first circuit configuration B 1252-1, the second circuit configuration B 1252-2, and the third circuit configuration B 1252-3 are combined into a circuit configuration B 1252, the first circuit configuration B 1252-1 constitutes an accelerator circuit of the first processor core 1232-1, the second circuit configuration B 1252-2 constitutes an accelerator circuit of the second processor core 1232-2, and the third circuit configuration B 1252-3 constitutes an accelerator circuit of the third processor core 1232-3. Note that a circuit including the first circuit configuration B 1252-1, the second circuit configuration B 1252-2, and the third circuit configuration B 1252-3 preferably uses a circuit region physically separated in the logic circuit 25 in consideration of hardware reliability.

In FIG. 11(*b*), the processing control unit 1203 compares results of three pieces of redundant processing individually executed in the first processing configuration B 1242-1, the second circuit configuration B 1242-2, and the third circuit configuration B 1242-3, so as to improve reliability for determination of the presence or absence of abnormality and validity of a result, and the like in predetermined processing.

For example, in Step S705 illustrated in FIG. 7 of the first embodiment described above, the processing control unit 203 determines whether or not abnormality is determined in the determination processing. In a case where the determination is made by the processing control unit 1203 of the second variation, the processing control unit 1203 may determine whether or not abnormality is determined from the results of three pieces of determination processing. A common unit 1231 may determine that there is no abnormality as a verification result in a case where all of three determination results indicate that there is no abnormality and in a case where two determination results indicate that there is no abnormality and one determination result indicates that there is abnormality. Further, the common unit 1231 may determine that there is abnormality as a verification result in a case where one determination result indicates that there is no abnormality and two determination results indicate that there is abnormality, and in a case where all of the three determination results indicate that there is abnormality.

According to the present variation, an action and an effect described below can be obtained.

(5) The processing control unit 203 includes a third processor core 232-3, and the determination is executed in the third processor.

(6) The processing control unit 203 includes the third processor core 232-3. Arithmetic processing by a third processing configuration that executes non-redundant processing using the first processor core 232-1, the second processor core 232-2, and the third processor core 232-3, and arithmetic processing by a fourth processing configuration that individually executes processing by causing the first processor core 232-1, the second processor core 232-2, and the third processor core 232-3 to be redundant are executed. The processing control unit 203 stores a result of the arithmetic processing by the third processing configuration in the storage unit 235, individually performs arithmetic processing using the stored result in each of the first processor core 232-1, the second processor core 232-2, and the third processor core 232-3 by the arithmetic processing by the fourth processing configuration, and performs determination for an arithmetic processing result by the third processing configuration based on an arithmetic result by the first processor core 232-1, an arithmetic result by the second processor core 232-2, and an arithmetic result by the third processor core 232-3. For this reason, the determination by triple redundant systems can be realized at low cost.

(7) The determination is abnormality presence/absence determination of a result of the arithmetic processing by the third processing configuration. For this reason, higher redundancy than in the first embodiment can be ensured.

(8) The abnormality presence/absence determination is based on a majority rule of results of an arithmetic result by the first processor core 232-1, an arithmetic result by the second processor core 232-2, and an arithmetic result by the third processor core 232-3. For this reason, not only the presence or absence of abnormality but also which is correct can be determined.

(Third Variation)

In the first embodiment described above, as illustrated in FIG. 4, the common unit 231 is described separately from the processor core 232. However, the common unit 231 may be realized by the first processor core 232-1 or the second processor core 232-2, or may be realized by another processor core (not illustrated) built in the autonomous traveling control device 2.

(Fourth Variation)

In the first embodiment described above, in the determination processing, a predicted position of an object around the own vehicle in a previous processing period is compared with a recognition result of the object around the own vehicle in a current processing period. However, instead of comparing them, each of them may be compared with a reference value, or only one of them may be compared with a reference value. In this case, for example, a qualitative or quantitative consistency rule is stored in the ROM 22 in advance. Then, in the determination processing, abnormality of a predicted position of an object around the own vehicle in a previous processing period is detected by comparing the predicted position of the object around the own vehicle in the previous processing period with the above-described consistency rule. Further, in the determination processing, abnormality of a recognition result of an object around the own vehicle in a current processing period is further detected by comparing the recognition result of the object around the own vehicle in the current processing period with the above-described consistency rule.

The consistency rule to be compared with the recognition result is, for example, a condition that is considered to be realistic from the specification of the sensor, that is, that the distance from the vehicle 100 to the object around the own vehicle does not exceed the limit of the sensor, or that the position of the object around the own vehicle falls within a visual field range of the sensor. The consistency rule to be compared with the predicted position of the object around the own vehicle is, for example, that the speed of the object around the own vehicle is equal to or less than a predetermined threshold.

(Fifth Variation)

In the first embodiment described above, the presence or absence of abnormality is determined in the determination processing. However, in the determination processing, the degree of abnormality may be determined without performing the determination of the presence or absence of abnormality. In this case, for example, in Step S706 in FIG. 7, the first processing configuration B 242-1 and the second processing configuration B 242-2 may evaluate the degree of abnormality in a plurality of stages, or may determine only the presence or absence of the possibility of abnormality. Further, in this case, in Step S707 in FIG. 7, the common unit 231 makes a negative determination in Step S707 in a case where the degrees of abnormality determined by the first processing configuration B 242-1 and the second processing configuration B 242-2 are the same and proceeds to Step S708, and makes an affirmative determination in a case where the degrees of abnormality determined by the configurations are not the same and ends the processing illustrated in FIG. 7.

(Sixth Variation)

The processing control unit 203 does not need to use the logic circuit 233 as an accelerator. In this case, the autonomous traveling control device 2 does not need to include the logic circuit 26. In this case, the management DB 3 does not need to include the field of the logic circuit 604.

(Seventh Variation)

In the first embodiment described above, the non-redundant processing configuration is described as the first non-redundant processing configuration illustrated in FIG. 4(a). However, the non-redundant processing configuration may be a second redundant processing configuration in which the first circuit configuration B 252-1 processes the output of the camera and the second circuit configuration B 252-2 processes the output of the laser.

(Eighth Variation)

In the sequence diagram illustrated in FIG. 8, the first determination processing operation and the second determination processing operation, which are redundant processing, are described to be executed substantially simultaneously. However, the redundant processing does not need to be executed strictly simultaneously or substantially simultaneously, and the processing time and the processing timing of each processor core may be different. In other words, even if the processing times and the processing timings of the first processing configuration B 242-1 and the second processing configuration B 242-2 are different, they may be treated as redundant processing.

Second Embodiment

A second embodiment of the autonomous traveling control device which is an electronic control device will be described with reference to FIG. 12. In description below, the same constituents as those of the first embodiment are denoted by the same reference numerals, and differences will be mainly described. Points not specifically described are the same as those in the first embodiment. The present embodiment is different from the first embodiment mainly in that the processing control unit 203 generates the management DB 3.

Figure 12:
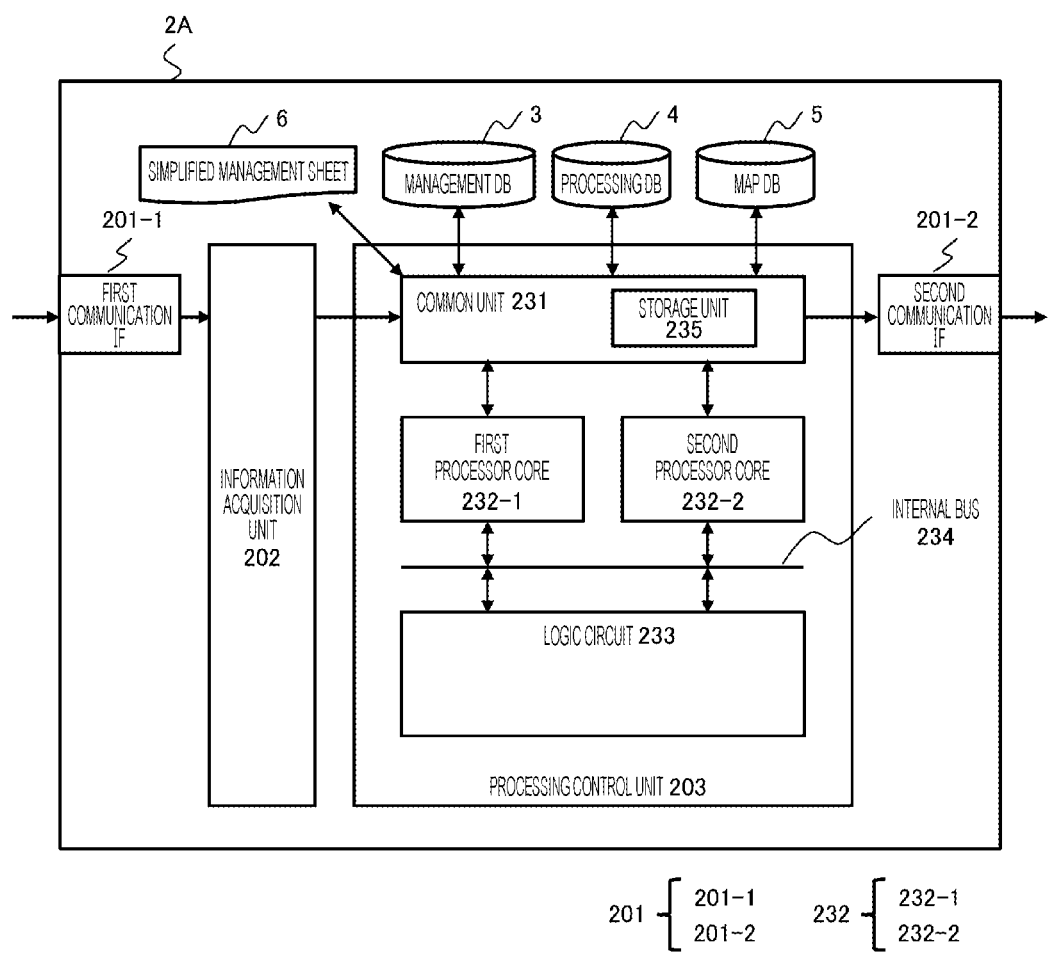
FIG. 12 is a functional configuration diagram of the autonomous traveling control device 2 according to a second embodiment.

FIG. 12 is a functional configuration diagram of the autonomous traveling control device 2 according to the present embodiment. In the present embodiment, a simplified management sheet 6 is further included. In the present embodiment, the common unit 231 also functions as a management DB creation unit that creates the management DB 3 on the basis of the simplified management sheet 6. That is, in the present embodiment, the management DB 3 is not stored in advance in the flash memory 24 or the ROM 22, but is created by the common unit 231. The simplified management sheet 6 is created in advance by an operator.

In the simplified management sheet 6, a name of processing to be executed, order of processing to be executed, time required to read each piece of circuit information, time required to rewrite a logic circuit, and execution time of the logic circuit are described. The processing control unit 203 starts creation of the management DB 3 when the power of the autonomous traveling control device 2 is turned on, and performs processing according to the description of the management DB 3 similarly to the first embodiment when the management DB 3 is completed. The creation of the management DB 3 by the processing control unit 203 is as described below.

The processing control unit 203 determines which of a redundant processing configuration and a non-redundant processing configuration is to be employed for processing other than the determination processing, and creates the management DB 3. Generally, focusing only on execution time, processing is completed in a shorter time when the non-redundant processing configuration is employed. However, since the non-redundant processing configuration may take a longer time to read circuit information and reconfigure a circuit, there is a case where the redundant processing configuration is completed in a shorter time in consideration of the time for reading and reconfiguration. For this reason, the processing control unit 203 determines which of the redundant processing configuration and the non-redundant processing configuration is to be employed for processing other than the determination processing so that execution time including reading and reconfiguration is minimized based on the information described in the simplified management sheet 6.

According to the second embodiment described above, there is an advantage that the processing control unit 203 can generate the optimal management DB 3.

The present invention is not limited to the above-described embodiments or variations, and includes various variations and equivalent configurations within the scope of the appended claims. For example, the above embodiments and variations are described in detail for easier understanding of the present invention, and the present invention is not necessarily limited to the embodiments that include the entirety of the described configurations. Further, a control line and an information line that are considered necessary for explanation are shown, and not all control lines or information lines necessary for implementation are shown. In practice, almost all configurations may be considered to be connected mutually.

The above-described embodiments and variations may be combined. Further, although various embodiments and variations are described above, the present invention is not limited to the content of these embodiments and variations. Other modes considered within the scope of the technical idea of the present invention are also included in the scope of the present invention.

The disclosure of the following priority application is incorporated herein by reference:

JP 2019-20509 (filed on Feb. 7, 2019)

REFERENCE SIGNS LIST 1 in-vehicle system
2 autonomous traveling control device
3 management database
4 processing database
100 vehicle
201 communication interface
202 information acquisition unit 203 processing control unit
231 common unit
232 processor core
232-1 first processor core
232-2 second processor core
233 logic circuit
241 processing configuration A
242 processing configuration B
242-1 first processing configuration B
242-2 second processing configuration B
251 circuit configuration A
252 circuit configuration B
252-1 first circuit configuration B
252-2 second circuit configuration B

The invention claimed is:

1. An electronic control device comprising:
a processing control unit; and
an information acquisition unit, wherein
the information acquisition unit collects external environment information and transfers the external environment information to the processing control unit,
the processing control unit includes a first processor, a second processor, a storage unit, and a reconfigurable logic circuit,
the processing control unit executes arithmetic processing by a non-redundant processing configuration that executes non-redundant processing using the first processor and the second processor, and arithmetic processing by a redundant processing configuration that executes redundant processing using the first processor and the second processor,
the processing control unit stores a result of arithmetic processing by the non-redundant processing configuration in the storage unit, individually performs arithmetic processing using the stored result in both the first processor and the second processor by arithmetic processing by the redundant processing configuration, and performs determination for an arithmetic processing result by the non-redundant processing configuration based on an arithmetic result by the first processor and an arithmetic result by the second processor, and
the reconfigurable logic circuit
executes processing together with the first processor and the second processor in the non-redundant processing configuration, and
divides a circuit into a first region and a second region by reconfiguration in the redundant processing configuration and executes processing individually by causing the first processor and the first region and the second processor and the second region to be redundant.

2. The electronic control device according to claim 1, wherein
the determination is abnormality presence/absence determination of a result of arithmetic processing by the non-redundant processing configuration.

3. The electronic control device according to claim 1, wherein
the determination is executed by the first processor or the second processor.

4. The electronic control device according to claim 1, wherein
the processing control unit includes a third processor, and
the determination is executed by the third processor.

5. The electronic control device according to claim 1, wherein
the processing control unit further includes a third processor, and
the processing control unit executes arithmetic processing by a third processing configuration that executes non-redundant processing using the first processor, the second processor, and the third processor, and arithmetic processing by a fourth processing configuration that individually executes processing by causing the first processor, the second processor, and the third processor to be redundant, stores a result of arithmetic processing by the third processing configuration in the storage unit, individually performs arithmetic processing using the stored result by the arithmetic processing by the fourth processing configuration in each of the first processor, the second processor, and the third processor, and performs determination for an arithmetic processing result by the third processing configuration based on an arithmetic result by the first processor, an arithmetic result by the second processor, and an arithmetic result by the third processor.

6. The electronic control device according to claim 5, wherein
the determination is abnormality presence/absence determination of a result of arithmetic processing by the third processing configuration.

7. The electronic control device according to claim 6, wherein
the abnormality presence/absence determination is based on a majority rule of results of an arithmetic result by the first processor, an arithmetic result by the second processor, and an arithmetic result by the third processor.

8. A control method executed by an electronic control device including a processing control unit and an information acquisition unit, the processing control unit including a first processor, a second processor, a storage unit, and a reconfigurable logic circuit, the control method comprising:
causing the information acquisition unit to collect external environment information and transfer the external environment information to the processing control unit;
causing the processing control unit to execute arithmetic processing by a first processing configuration that executes non-redundant processing using the first processor and the second processor, and arithmetic processing by a second processing configuration that executes processing individually by causing the first processor and the second processor to be redundant;
causing the processing control unit to store a result of arithmetic processing by the first processing configuration in the storage unit, individually perform arithmetic processing using the stored result in both the first processor and the second processor by arithmetic processing by the second processing configuration, and perform determination for an arithmetic processing result by the first processing configuration based on an arithmetic result by the first processor and an arithmetic result by the second processor; and
causing the reconfigurable logic circuit to
execute processing together with the first processor and the second processor in the non-redundant processing configuration, and
divide a circuit into a first region and a second region by reconfiguration in the redundant processing configuration and executes processing individually by causing the first processor and the first region and the second processor and the second region to be redundant.

\* \* \* \* \*